United States Patent
Ver Steeg et al.

(10) Patent No.: US 8,301,982 B2
(45) Date of Patent: Oct. 30, 2012

(54) RTP-BASED LOSS RECOVERY AND QUALITY MONITORING FOR NON-IP AND RAW-IP MPEG TRANSPORT FLOWS

(75) Inventors: William C. Ver Steeg, Alpharetta, GA (US); Ali C. Begen, London (CA)

(73) Assignee: Cisco Technology, Inc., San Jose, CA (US)

( * ) Notice: Subject to any disclaimer, the term of this patent is extended or adjusted under 35 U.S.C. 154(b) by 433 days.

(21) Appl. No.: 12/620,779

(22) Filed: Nov. 18, 2009

(65) Prior Publication Data

US 2011/0119546 A1    May 19, 2011

(51) Int. Cl.
*H03M 13/00* (2006.01)

(52) U.S. Cl. .......................................... 714/776
(58) Field of Classification Search ................... 714/776
See application file for complete search history.

(56) References Cited

U.S. PATENT DOCUMENTS

| | | |
|---|---|---|
| 4,788,656 A | 11/1988 | Sternberger |
| 4,907,277 A | 3/1990 | Callens et al. |
| 4,996,663 A | 2/1991 | Nemes |
| 5,414,704 A | 5/1995 | Spinney |
| 5,450,449 A | 9/1995 | Kroon |
| 5,617,421 A | 4/1997 | Chin et al. |
| 5,699,478 A | 12/1997 | Nahumi |
| 5,699,485 A | 12/1997 | Shoham |
| 5,806,086 A | 9/1998 | Kimmel et al. |
| 5,842,040 A | 11/1998 | Hughes et al. |
| 5,884,010 A | 3/1999 | Chen et al. |
| 5,898,837 A | 4/1999 | Guttman et al. |
| 5,943,347 A | 8/1999 | Shepard |
| 5,946,302 A | 8/1999 | Waclawsky et al. |
| 5,956,721 A | 9/1999 | Douceur et al. |
| 5,995,488 A | 11/1999 | Kalkunte et al. |
| 5,995,971 A | 11/1999 | Douceur et al. |
| 6,104,696 A | 8/2000 | Kadambi |
| 6,185,208 B1 | 2/2001 | Liao |
| 6,275,861 B1 | 8/2001 | Chaudri et al. |
| 6,314,095 B1 | 11/2001 | Loa |
| 6,341,130 B1 | 1/2002 | Lakshman et al. |
| 6,356,545 B1 | 3/2002 | Vargo et al. |
| 6,389,006 B1 | 5/2002 | Bialik |
| 6,421,802 B1 | 7/2002 | Schildbach et al. |
| 6,434,153 B1 | 8/2002 | Yazaki et al. |
| 6,438,695 B1 | 8/2002 | Maufer |
| 6,507,562 B1 | 1/2003 | Kadansky et al. |

(Continued)

OTHER PUBLICATIONS

U.S. Appl. No. 12/566,007, filed Sep. 24, 2009, entitled "Distributed Coordination of Network Elements for Packet Encapsulation", Inventors: Begen et al.

(Continued)

*Primary Examiner* — Philip Guyton
(74) *Attorney, Agent, or Firm* — Merchant & Gould (57) ABSTRACT

In one method embodiment, transmitting a transport stream formatted according to a defined coding specification to a receive-and-process (RP) system, the transport stream format further comprising a non-Internet protocol (IP) format or a raw-IP format; providing a mapping stream, the mapping stream correlating the transport stream to a Real-time Transport Protocol (RTP)-formatted data stream that encapsulates the transport stream, the mapping stream comprising identifying information corresponding to the transport stream and second identifying information corresponding to the data stream; and transmitting the mapping stream to the RP system over an IP connection to enable RTP capabilities at the RP system.

17 Claims, 8 Drawing Sheets

U.S. PATENT DOCUMENTS

| | | |
|---|---|---|
| 6,542,508 B1 | 4/2003 | Lin |
| 6,587,985 B1 * | 7/2003 | Fukushima et al. ......... 714/748 |
| 6,590,894 B1 | 7/2003 | Kerr et al. |
| 6,611,502 B1 | 8/2003 | Seaman |
| 6,629,141 B2 | 9/2003 | Elzur et al. |
| 6,658,000 B1 | 12/2003 | Raciborski et al. |
| 6,665,637 B2 | 12/2003 | Bruhn |
| 6,671,722 B1 | 12/2003 | Stachura et al. |
| 6,687,360 B2 | 2/2004 | Kung et al. |
| 6,741,600 B1 | 5/2004 | Weiss et al. |
| 6,757,654 B1 | 6/2004 | Westerlund et al. |
| 6,760,309 B1 | 7/2004 | Rochberger et al. |
| 6,801,496 B1 | 10/2004 | Saleh et al. |
| 6,801,525 B1 | 10/2004 | Bodnar et al. |
| 6,847,928 B1 | 1/2005 | Naka |
| 6,854,117 B1 | 2/2005 | Roberts |
| 6,868,069 B2 | 3/2005 | Knobbe et al. |
| 6,909,702 B2 | 6/2005 | Leung et al. |
| 6,928,482 B1 | 8/2005 | Ben-Nun et al. |
| 7,010,611 B1 | 3/2006 | Wiryaman et al. |
| 7,013,267 B1 * | 3/2006 | Huart et al. ................ 704/207 |
| 7,036,049 B2 | 4/2006 | Ali et al. |
| 7,055,174 B1 | 5/2006 | Cope et al. |
| 7,062,689 B2 | 6/2006 | Slobodnik |
| 7,139,242 B2 | 11/2006 | Bays |
| 7,154,855 B2 | 12/2006 | Hardy |
| 7,206,385 B2 | 4/2007 | Ethier et al. |
| 7,248,682 B1 | 7/2007 | Oran |
| 7,269,157 B2 | 9/2007 | Klinker et al. |
| 7,286,467 B1 | 10/2007 | Sylvain |
| 7,305,464 B2 | 12/2007 | Philipi et al. |
| 7,324,499 B1 | 1/2008 | Borella et al. |
| 7,436,830 B2 | 10/2008 | Ben-Nun et al. |
| 7,454,494 B1 | 11/2008 | Hedayat et al. |
| 7,483,400 B2 | 1/2009 | Kuusinen et al. |
| 7,496,044 B1 | 2/2009 | Wing |
| 7,506,194 B2 | 3/2009 | Appanna et al. |
| 7,515,525 B2 | 4/2009 | Appanna et al. |
| 7,633,879 B2 | 12/2009 | Ramalho |
| 7,675,901 B2 * | 3/2010 | Wang et al. ................ 370/352 |
| 7,835,406 B2 * | 11/2010 | Oran et al. ................ 370/522 |
| 2002/0016856 A1 | 2/2002 | Tallegas et al. |
| 2002/0064273 A1 | 5/2002 | Tomikawa et al. |
| 2002/0075895 A1 | 6/2002 | Yamaguchi et al. |
| 2002/0116501 A1 | 8/2002 | Ho et al. |
| 2002/0131425 A1 | 9/2002 | Shalom |
| 2002/0141392 A1 | 10/2002 | Tezuka et al. |
| 2002/0150050 A1 | 10/2002 | Nathanson |
| 2002/0194361 A1 | 12/2002 | Itoh et al. |
| 2002/0194606 A1 * | 12/2002 | Tucker et al. ................ 725/86 |
| 2003/0014705 A1 | 1/2003 | Suzuki et al. |
| 2003/0023710 A1 | 1/2003 | Corlett et al. |
| 2003/0026241 A1 | 2/2003 | Ono et al. |
| 2003/0048786 A1 | 3/2003 | Annunzio |
| 2003/0086425 A1 | 5/2003 | Bearden |
| 2003/0117959 A1 | 6/2003 | Taranov |
| 2003/0120789 A1 | 6/2003 | Hepworth |
| 2003/0198249 A1 | 10/2003 | Klein et al. |
| 2003/0204617 A1 | 10/2003 | Buchsbaum et al. |
| 2003/0227917 A1 | 12/2003 | Maher |
| 2004/0037267 A1 | 2/2004 | Bennett et al. |
| 2004/0037320 A1 | 2/2004 | Dickson |
| 2004/0042456 A1 | 3/2004 | Dittmann et al. |
| 2004/0071135 A1 | 4/2004 | Jimmei et al. |
| 2004/0073641 A1 | 4/2004 | Minhazuddin et al. |
| 2004/0095894 A1 | 5/2004 | Eloranta et al. |
| 2004/0141502 A1 | 7/2004 | Corson et al. |
| 2004/0179513 A1 | 9/2004 | Smith et al. |
| 2004/0181599 A1 | 9/2004 | Kreusch |
| 2004/0185836 A1 | 9/2004 | Pelaez et al. |
| 2004/0203787 A1 | 10/2004 | Naghian |
| 2004/0252694 A1 | 12/2004 | Adhikari et al. |
| 2004/0264433 A1 | 12/2004 | Melpignano |
| 2005/0102423 A1 | 5/2005 | Pelavin et al. |
| 2005/0182850 A1 * | 8/2005 | Kohno ................ 709/236 |
| 2005/0220035 A1 | 10/2005 | Ling et al. |
| 2005/0232227 A1 | 10/2005 | Jorgenson |
| 2005/0243733 A1 | 11/2005 | Crawford |
| 2005/0276276 A1 | 12/2005 | Davis |
| 2006/0002366 A1 | 1/2006 | Kawaguchi et al. |
| 2006/0010243 A1 | 1/2006 | DuRee |
| 2006/0029065 A1 | 2/2006 | Fellman |
| 2006/0031445 A1 | 2/2006 | Rajan et al. |
| 2006/0031510 A1 | 2/2006 | Beck et al. |
| 2006/0059411 A1 | 3/2006 | Dacosta |
| 2006/0106961 A1 | 5/2006 | Ebata et al. |
| 2006/0107187 A1 | 5/2006 | Hannuksela |
| 2006/0114855 A1 | 6/2006 | Zheng |
| 2006/0126528 A1 | 6/2006 | Ramalho |
| 2006/0143300 A1 | 6/2006 | See et al. |
| 2006/0182034 A1 | 8/2006 | Klinker et al. |
| 2006/0221837 A1 | 10/2006 | Gardner et al. |
| 2006/0221930 A1 | 10/2006 | Sweeney |
| 2006/0262716 A1 | 11/2006 | Ramaiah et al. |
| 2006/0280207 A1 | 12/2006 | Guarini et al. |
| 2007/0036087 A1 | 2/2007 | Kangru |
| 2007/0199052 A1 | 8/2007 | Sankaran |
| 2007/0230486 A1 | 10/2007 | Zafirov |
| 2008/0037864 A1 | 2/2008 | Zhang et al. |
| 2008/0069002 A1 | 3/2008 | Savoor et al. |
| 2008/0159279 A1 | 7/2008 | Younis et al. |
| 2008/0170117 A1 | 7/2008 | Xiao |
| 2008/0220765 A1 | 9/2008 | Chu et al. |
| 2008/0259924 A1 | 10/2008 | Gooch et al. |
| 2008/0285452 A1 | 11/2008 | Oran et al. |
| 2008/0285463 A1 | 11/2008 | Oran |
| 2008/0310316 A1 | 12/2008 | Oran et al. |
| 2008/0317011 A1 | 12/2008 | Datta et al. |
| 2009/0010158 A1 | 1/2009 | Filsfils et al. |
| 2009/0119722 A1 | 5/2009 | Ver Steeg et al. |

OTHER PUBLICATIONS

Begen et al., "Reducing Channel Change Times in IPTV with Real-Time Transport Protocol", pp. 1-6.

Begen et al., "Error Control for IPTV over xDSL Networks", Video and Content Networking Business Unit Cisco Systems, 6 pages.

U.S. Appl. No. 12/782,777, filed May 19, 2010, entitled "Ratings and Quality Measurements for digital Broadcast Viewers", Inventors: Begen et al.

U.S. Appl. No. 11/764,722, filed Jun. 18, 2007, entitled "Surrogate Stream for Monitoring Real Time Media", Inventors: Oran et al.

U.S. Official Action dated Mar. 31, 2010 in U.S. Appl. No. 11/764,722.

Braden, Network Working Group, Requirements for Internet Hosts-Communication Layers, Oct. 1989, pp. 1-90.

Degermark, IP Header Compression, Feb. 1999, RFC 2507, pp. 1-42.

Friedman et al., "RTP Control Protocol Extended Reports (RTCP XR)", RFC 3611, Nov. 2003, pp. 1-56.

Hamzeh et al., "Point-to-Point Tunneling Protocol (PPTP)", RFC 2637, Jul. 1999.

Information Sciences Institute, University of Southern California, Internet Protocol DARPA Internet Program Protocol Specification, Sep. 1981, pp. 1-46.

Information Sciences Institute, University of Southern California, Transmission Control Protocol, DARPA Internet Program Protocol Specification, Sep. 1981, pp. 1-84.

Jonsson, Robust Header Compression (ROHC), a Link-Layer Assisted Profile for IP/UDP/RTP, Jan. 2006, RFC 4362, pp. 1-21.

Lakshman et al, High-Speed Policy-Based Packet Forwarding Using Efficient Multi-Dimensional Range Matching, 1998, ACM SIGCOMM Computer Communication Review, vol. 28 No. 4, 12 pages.

Liao et al., "Adaptive recovery techniques for real-time audio streams," IEE INFOCOM 2001, Twentieth Annual Joint Conference of the IEEE Computer and Communications Societies Proceedings, Apr. 22-26, 2001, vol. 2, pp. 815-823.

Rosenberg, An Offer/Answer Model with Session Description Protocol (SDP), Jun. 2002, RFC 3264, pp. 1-26.

Singer and Desineni, "A General Mechanism for RTP Header Extensions", draft-ietf-avt-rtp-hdrext-12txt, Feb. 26, 2007, pp. 1-23.

Song, Kevin, "The ABC's of Network Security", The Certified Security Professional, Certification Magazine, Feb. 2004, 3 pages.

Thompson, Tunneling Multiplexed Compressed RTP (TCRTP), Nov. 2005, RFC 4170, pp. 1-22.
Welch, A Proposed Media Delivery Index (MDI), Apr. 2006, RFC 4445, pp. 1-9.
U.S. Official Action dated Aug. 5, 2009 in U.S. Appl. No. 11/764,722.
Schulzrinne, et al., RTP: A Transport Protocol for Real-Time Applications, Network Working Group, 2003, pp. 1-92.
J. Postel, "User Datagram Protocol", retrieved from http://www.faqs.org/rfcs/rfc768.html on Jun. 13, 2009, Originally published on Aug. 28, 1980, pp. 1-3.
Pendleton, et al., "Session Initiation Package for Voice Quality Reporting Event", Sipping Working Group, 2006, 22 pages.

* cited by examiner

RTP-BASED LOSS RECOVERY AND QUALITY MONITORING FOR NON-IP AND RAW-IP MPEG TRANSPORT FLOWS

TECHNICAL FIELD

The present disclosure relates generally to video stream distribution with quality enhancements and packet-level repair.

BACKGROUND

The recent transition from analog transmission to all digital services in North America has some repercussions in terms of viewer satisfaction. For instance, when noise impacts an analog feed, though annoying, viewers are generally accustomed to the analog artifacts that ensue. In contrast, when errors occur in digital video signals, artifacts (e.g., severe pixilation) are quite jarring to the viewer. When deploying terrestrial broadcast or other types of non-Internet Protocol (IP)-based digital video distribution systems, the link layer forward error correction is generally the only mechanism available to correct these and other errors in transmission.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one method embodiment, transmitting a transport stream formatted according to a defined coding specification to a receive-and-process (RP) system, the transport stream format further comprising a non-Internet protocol (IP) format or a raw-IP format; providing a mapping stream, the mapping stream correlating the transport stream to a Real-time Transport Protocol (RTP)-formatted data stream that encapsulates the transport stream, the mapping stream comprising identifying information corresponding to the transport stream and second identifying information corresponding to the data stream; and transmitting the mapping stream to the RP system over an IP connection to enable RTP capabilities at the RP system.

Example Embodiments

Disclosed herein are various example embodiments of video quality enhancement (VQE) systems and methods in a communications environment, such as a subscriber television system, that enable packet-level error repair, fast channel change, and/or RTP Control Protocol (RTCP) feedback reports for non-Internet Protocol (IP) and raw-IP transport streams (the transport stream comprising one or more of compressed video, audio, and/or data streams, the compression of each according to one of a plurality of video and/or audio coding standards/specification). Note that VQE systems and methods are collectively referred to herein also as a VQE system or VQE systems. Although the raw and non-IP transport streams may comprise of coded video, audio, data, alone or in some combination, reference will also be made herein to raw and non-IP transport streams in the context of video streams for purposes of illustration, with the understanding that Moving Picture Experts Group (MPEG)-based (e.g., MPEG-2) transport mechanisms, or other transport mechanisms in some embodiments, are contemplated as the carrier of the compressed video, audio, and/or data. It is further noted that reference to non-IP video streams includes video streams encoded according to a video coding specification such MPEG-2, AVC, among others, and carried as a transport stream (single program or multiple program) with no User Datagram Protocol (UDP) or Real-time Transport Protocol (RTP) packet formatting. Further, reference to raw-IP video streams includes video streams encoded according to a video coding specification such as MPEG-2, among others, and carried as a transport stream (single program or multiple programs) encapsulated in IP/UDP-only. Additionally, video, audio, and/or data streams are also referred to herein as flows, and MPEG-2TS refers to MPEG-2 transport streams.

One embodiment of the VQE systems uses one or a combination of RTP-based packet-level (as opposed to relying exclusively on the link layer) forward error correction (FEC) and retransmissions to repair losses on terrestrial broadcast (or satellite, DVB-T, DVB-C, or North American cable, among other networks), single program transport stream (SPTS) or multiple program transport stream (MPTS) transmissions. Such a VQE system embodiment transmits a non-IP video stream to one or more customer premises, each comprising a receive-and-process (RP) system with decoding functionality, the non-IP video stream delivered over a communications network. In addition, the non-IP video stream is also provided to an encapsulator, such as an RTP encapsulator. The RTP encapsulator builds RTP packets (e.g., IP/UDP/RTP/MPEG-2TS encapsulation) from the video stream and also builds a mapping stream, the latter describing which transport stream packets correspond to which RTP packets based on a correlation of identifying information from the RTP headers and the transport layer of, for instance, an MPEG-2TS. The mapping stream is delivered to one or more RP systems over an IP connection, where the mapping stream is used to enable or facilitate packet-level repair, retransmission, and/or feedback report generation and transmission over the IP connection. For instance, in some embodiments, FEC packets (e.g., according to ProMEG COP3, among other FEC schemes known to those having ordinary skill in the art) are also sent over an IP connection to enable proactive repair of transmission errors in the non-IP or raw-IP video streams.

In some embodiments, a raw IP video stream is transmitted to one or more RP systems and is also RTP-encapsulated to derive a mapping stream, the latter which is transmitted over an IP connection to facilitate benefits related to RTP at one or more RP systems.

Further, the RP systems of one or more VQE system embodiments are configured with executable code and/or other logic (e.g., referred to herein as IP decoding logic) that enables the creation or processing of mappings that provide a correlation between transport packets of the non-IP or raw-IP video streams and RTP packets that encapsulate non-IP or raw-IP video streams, detection and identification of missing packets (i.e., missing from the non-IP or raw-IP MPEG-2TS flows), the processing of FEC (e.g., encapsulated in RTP) to recover missing packets, building of RTP packets based on the mapping stream, and/or the requesting of retransmissions (e.g., encapsulated in RTP) and putting the retransmissions (packets) in proper order.

Reference herein to VQE features or VQE aspects includes RTP features or capabilities, such as packet-level error repair, retransmission, and feedback report generation over an IP connection.

These and other embodiments and/or other features are described hereinafter in the context of an example subscriber television system environment, with the understanding that other multimedia (e.g., video, graphics, audio, and/or data, or otherwise referred to also herein individually or collectively as media content) environments may also benefit from certain embodiments of the VQE systems and methods and hence are contemplated to be within the scope of the disclosure. It should be understood by one having ordinary skill in the art that, though specifics for one or more embodiments are disclosed herein, such specifics as described are not necessarily part of every embodiment.

Figure 1:
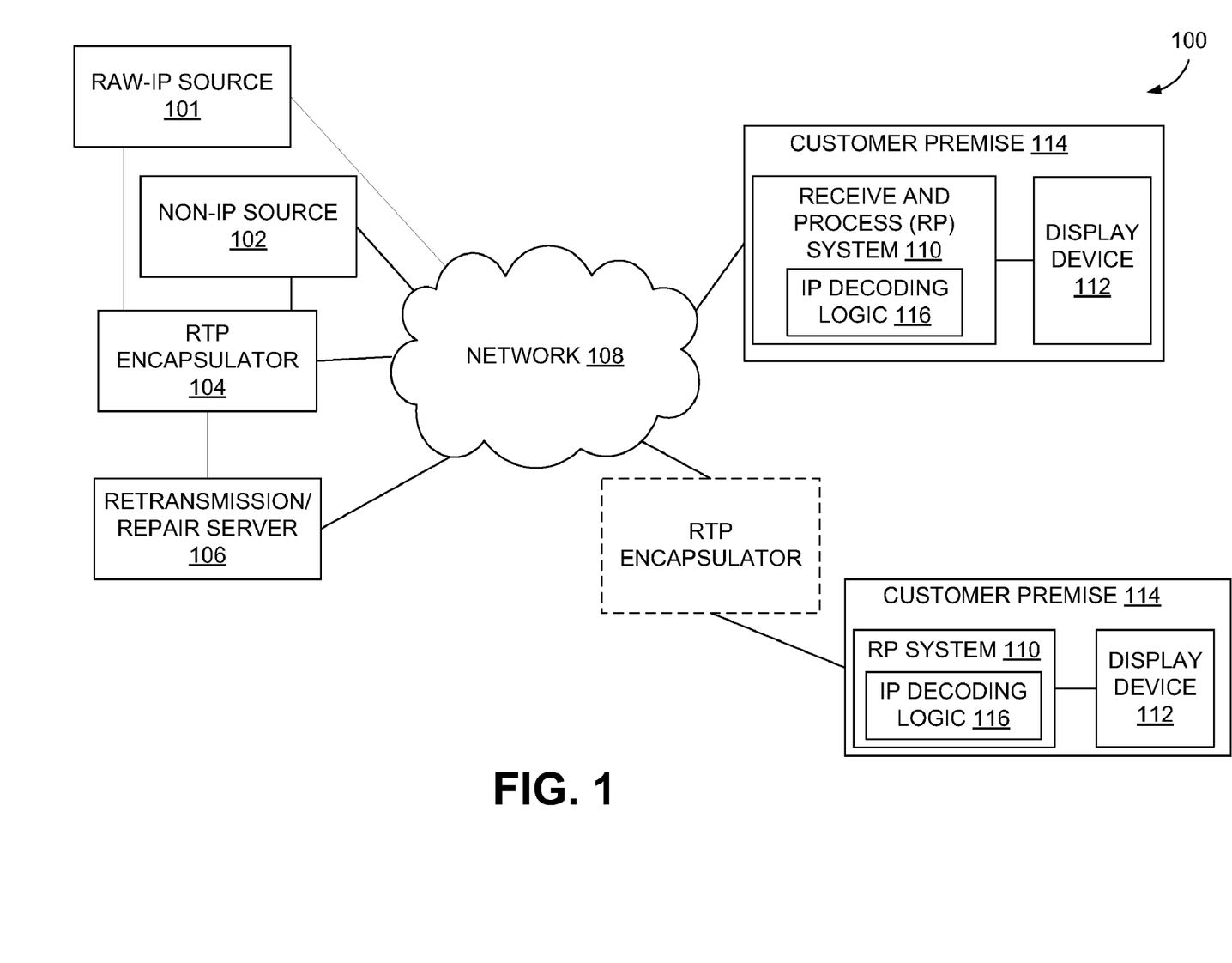
FIG. 1 is a block diagram that illustrates an example environment in which certain embodiments of video quality enhancement (VQE) systems and methods can be implemented.

FIG. 1 is a block diagram of an example environment, a subscriber television network 100, in which certain embodiments of VQE systems and/or methods may be implemented. The subscriber television network 100 includes one or more raw IP sources (e.g., IP/UDP/MPEG-2TS) 101 and/or one or more non-IP sources (e.g., MPEG-2TS without IP/UDP encapsulation) 102 communicatively coupled to one or more customer premises 114 over a communications network 108. In one embodiment, the raw-IP source 101 and non-IP source 102 deliver encoded video content (among other media content, such as audio and/or data content) for a single program carried in a single MPEG-2 program stream (e.g., one or more packetized elementary stream (PES) packet streams sharing a common time base), and in other implementations, the encoded visual content for multiple programs may be carried as multiple MPEG-2 programs, each MPEG-2 program associated with its own respective time base. It should be understood that, although MPEG-2 based video encoding and transport is described throughout the disclosure, encoding and transport (collectively coding) according to other video and/or audio specifications and/or standards (including proprietary mechanisms) may similarly benefit from the VQE systems described herein and hence are contemplated to be within the scope of the disclosure.

The subscriber television network 100 further includes one or more encapsulator systems, such as RTP encapsulator 104. The RTP encapsulator 104 comprises logic (hardware, software, or a combination of hardware and software) to convert raw or non-IP video stream packets to RTP packets, create mapping streams, and in some embodiment, optionally create FEC packets. The subscriber television network 100 also comprises one or more retransmission/repair servers, such as retransmission/repair (R/R) server 106 communicatively coupled to the RTP encapsulator 104. The R/R server 106 is configured to receive the RTP encapsulated streams generated by the encapsulator 104 and deliver RTP-encapsulated MPEG streams for devices capable of receiving RTP-encapsulated MPEG streams, or hereinafter referenced as RTP-capable devices, and further comprises logic (e.g., software, hardware, or a combination of both) that provides retransmitted packets (e.g., RTP-encapsulated) responsive to retransmission requests from the customer premises 114, processes feedback reports from the customer premises 114, and/or provides rapid channel changing functionality. In some embodiments, the R/R server 106 receives RTP-encapsulated FEC packets from the encapsulator 104 for delivery to plural customer premises 114, while some system embodiments may rely on transmission of RTP-encapsulated FEC packets directly from the encapsulator 104. The R/R server 106 is also configured in some embodiments to receive auxiliary data (e.g., non-RTP requests), in addition to or in lieu of RTP requests, from customer premises 114, and process mappings to deliver retransmissions, as explained further below. In one embodiment, the raw-IP source 101, non-IP source 102, RTP encapsulator 104, and R/R server 106 are coupled to one another via a local area network (e.g., an Ethernet network).

In one embodiment, the raw-IP source 101 and non-IP source 102 may reside in a service provider facility located upstream of a headend, and the RTP encapsulator 104 and R/R server 106 may reside in the headend (or a downstream hub or node). In some embodiments, as mentioned above, the raw-IP source 101, non-IP source 102, RTP encapsulator 104, and R/R server 106 may be co-located (e.g., in a headend). In some embodiments, one or more of the various functionality of the RTP encapsulator 104 may reside in other devices, such as in the R/R server 106, the raw-IP source 101, the non-IP source 102, among other devices (e.g., such as residing within a gateway at the network edge, within a customer premise 114, or elsewhere in the network, as shown in phantom in FIG. 1).

The customer premises 114 each comprise a receive-and-process (RP) system 110 and one or more display devices, such as display device 112. The display device 112 is coupled to, or in some embodiments, integrated with, the RP system 110. In one implementation, the display device 112 is configured with an audio component (e.g., speakers), whereas in some implementations, audio functionality may be provided by a device that is separate from, yet communicatively coupled to, the display device 112 and/or RP system 110. The RP system 110 further includes IP decoding logic 116, which includes functionality to process and/or create mapping streams or auxiliary data, generate retransmission requests, FEC processing, channel change request generation, and in some embodiments build RTP packets (e.g., based on the mapping stream). Though emphasis of the present disclosure is on non-RTP capable RP systems 110 (e.g., unable to receive RTP-encapsulated MPEG flows) configured in the VQE system embodiments to reap the benefits of RTP capabilities, it should be appreciated that some embodiments of the subscriber television network 100 may comprise RP systems (not shown) capable of receiving and processing RTP-encapsulated MPEG flows (e.g., IP/UDP/RTP/MPEG-2TS streams). The RP system 110 (also referred to herein as a digital receiver or processing device) may comprise one of many devices or a combination of devices, such as a set-top box, television with communication capabilities, cellular phone, personal digital assistant (PDA), or other computer or computer-based device or system, such as a laptop, personal computer, DVD and/or CD recorder, among others.

The communications network 108 comprises a one-way network or, in some embodiments, a bi-directional network, and may include a cable television network, a satellite television network, a terrestrial network, an IP network, or a combination of two or more of these networks or other networks. Further, network PVR and switched digital video are also considered within the scope of the disclosure. Generally, the communications network 108 may comprise a single network, or a combination of networks (e.g., local and/or wide area networks). For instance, the communications network 108 may comprise a wired connection or wireless connection (e.g., satellite, wireless LAN, etc.), or a combination of both. In the case of wired implementations, communications network 108 may comprise a hybrid-fiber coaxial (HFC) medium, coaxial, optical, twisted pair, etc. Other networks are contemplated to be within the scope of the disclosure, including networks that use packets incorporated with and/or compliant to other transport protocols or standards or specifications.

Although described in the context of video processing, it should be understood that certain embodiments of the VQE systems described herein also include functionality for the processing of other media content such as compressed or uncompressed audio streams, data streams, and/or graphics or image streams.

Figure 4:
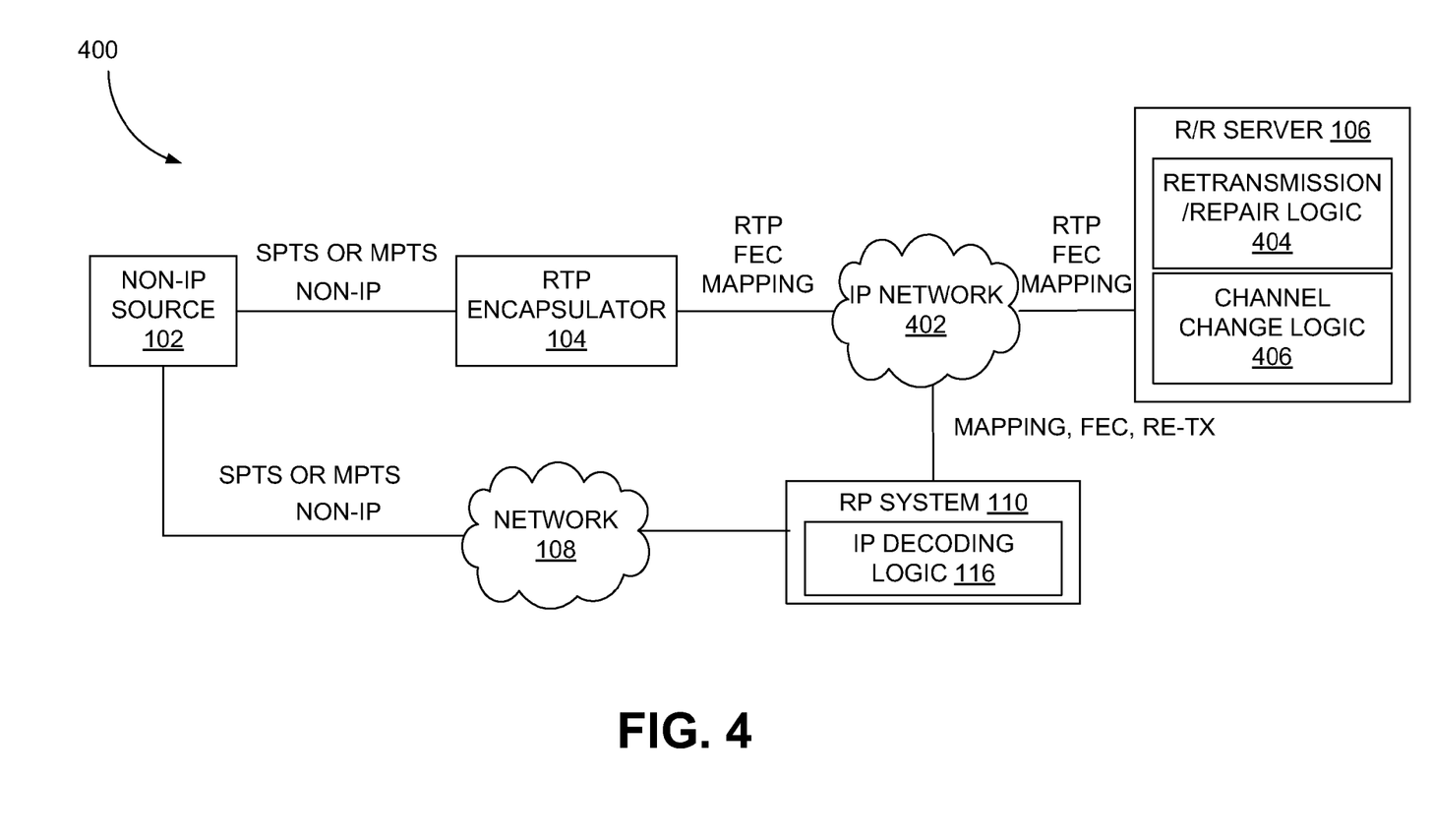
FIG. 4 is a block diagram that illustrates an embodiment of an example VQE system that processes non-Internet Protocol (IP), Moving Picture Experts Group (MPEG) transport streams.
Figure 5A:
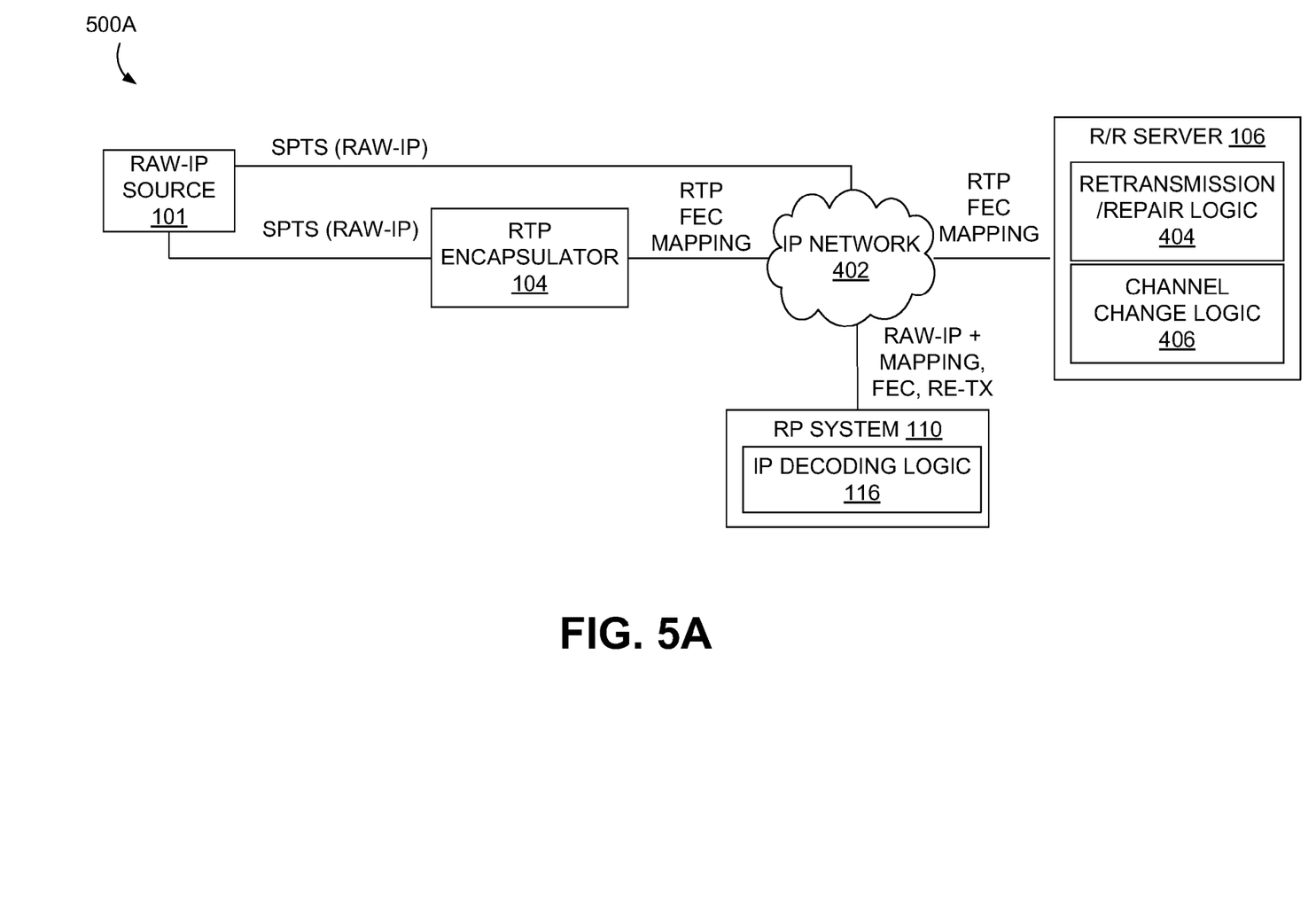
FIG. 5A is a block diagram that illustrates an embodiment of an example VQE system that processes raw-IP, MPEG transport streams.
Figure 5B:
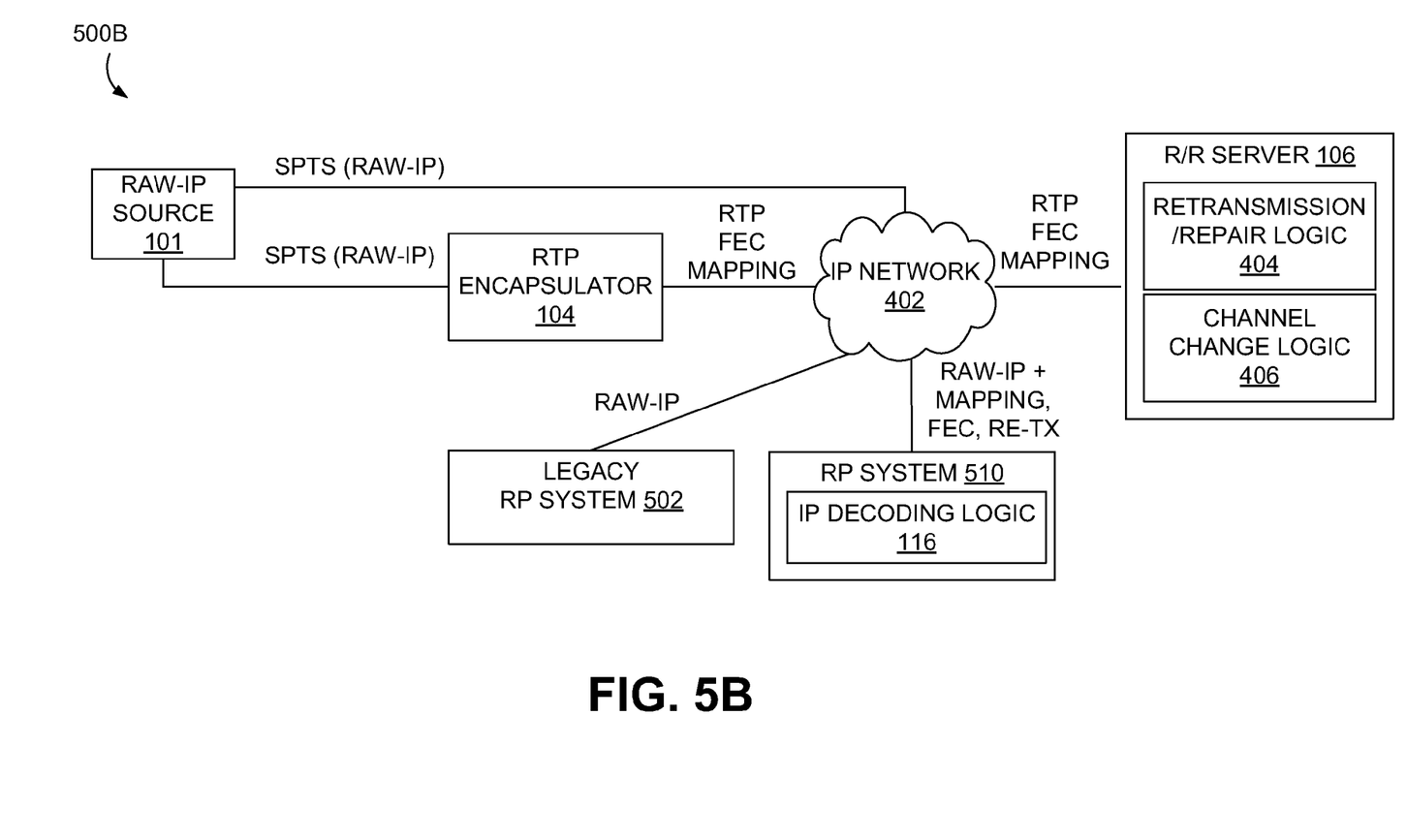
FIG. 5B is a block diagram that illustrates an embodiment of an example VQE system that processes raw-IP, MPEG transport streams in a brownfield environment.
Figure 6:
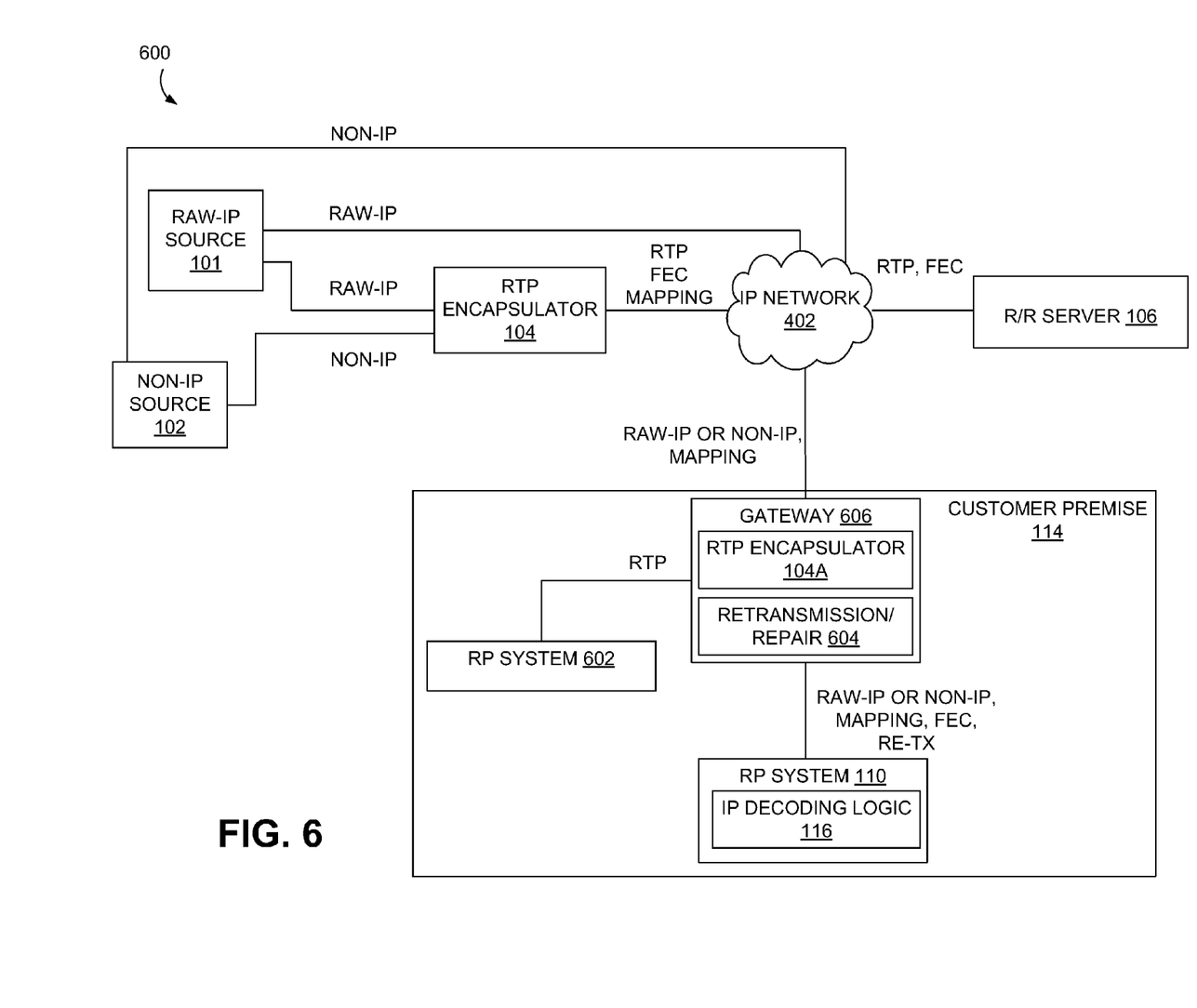
FIG. 6 is a block diagram that illustrates an embodiment of an example VQE system that processes raw-IP, MPEG transport streams using a gateway at a customer premise.

The subscriber television network 100 (or components thereof) may comprise one or more other servers, routers, and/or switches at one or more locations of the network 100 that process and deliver and/or forward (e.g., route) various digital services to subscribers. Such digital services may include broadcast television programming, video-on-demand (VoD), pay-per-view, music, Internet access, e-commerce (e.g., online shopping), voice-over-IP (VoIP), and/or other telephone or data services. In one embodiment, the components of a VQE system comprise the RTP encapsulator 104 or the IP decoding logic 116 alone, or in some embodiments as part of a server-client relationship (or as merely two components that communicate, directly or indirectly, with one another). In some embodiments, the VQE system comprises these components and/or others shown (or not shown) in FIG. 1, such as illustrated in FIGS. 4-6 and described below.

In some embodiments, the subscriber television network 100 (or components thereof) may further comprise additional components, such as QAM and/or QPSK modulators, routers, bridges, Internet Service Provider (ISP) facility servers, private servers, on-demand servers, channel change servers (e.g., R/R server 106), multimedia messaging servers, program guide servers, gateways, multiplexers, and/or transmitters, among other equipment, components, and/or devices well-known to those having ordinary skill in the art.

Figure 2:
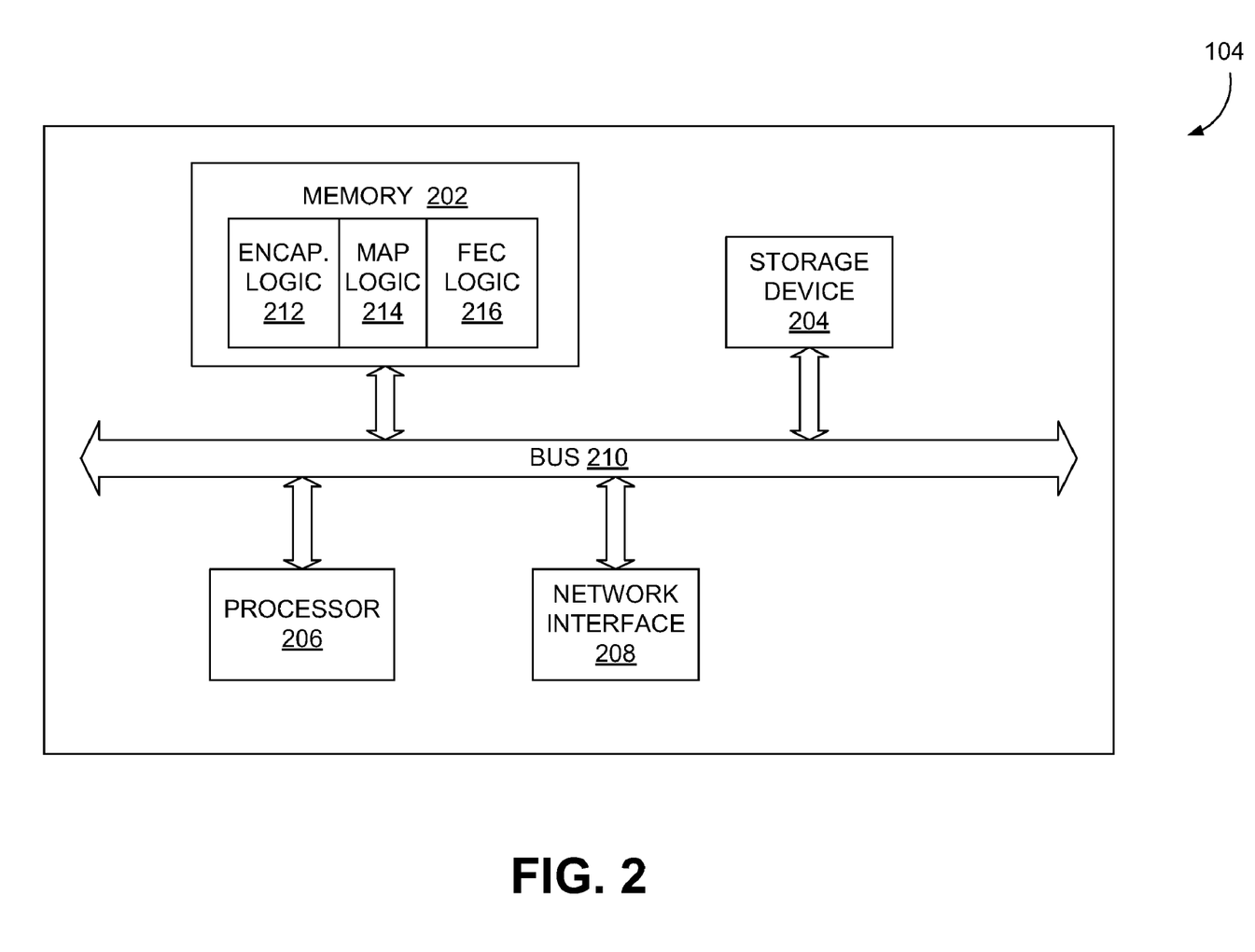
FIG. 2 is a block diagram that illustrates an embodiment of an example Real-time Transport Protocol (RTP) encapsulator system of an example VQE system.

FIG. 2 is a block diagram that illustrates an embodiment of an example RTP encapsulator 104. It should be understood by one having ordinary skill in the art, in the context of the present disclosure, that the RTP encapsulator 104 shown in FIG. 2 is merely illustrative, and should not be construed as implying any limitations upon the scope of the disclosure. The RTP encapsulator 104 comprises a memory 202 (e.g., a tangible medium such as random access memory (RAM), read-only memory (ROM), etc.) encoded with various instructions or executable code, an optional storage device 204 (e.g., CD, DVD, etc.), a processor 206 (e.g., microcontroller, microprocessor, digital signal processor, etc.), and a network interface 208 configured to enable the reception of raw or non-IP video streams, among other data, and to enable the communication (e.g., to the R/R server 106 or customer premises 114) of a mapping stream to the customer premises 114, R/R server 106, or local storage, FEC packets (e.g., RTP-encapsulated) to the customer premises 114 or in some embodiments (e.g., multicast of FEC packets) to the R/R server 106, and RTP-encapsulated MPEG streams to the R/R server 106. The memory 202, storage device 204, processor 206, and network interface 208 are coupled over a bus 210. In one embodiment, the memory 202 comprises RTP encapsulation logic (encap. logic) 212, mapping logic (map logic) 214, and FEC logic 216. The encapsulation logic 212 is configured to RTP encapsulate the raw or non-IP video streams received from the raw-IP source 101 and non-IP source 102, respectively. The mapping logic 214 is configured to build a mapping stream that correlates the RTP encapsulated raw or non-IP video streams with the received raw or non-IP video streams, respectively. In some embodiments, the mapping logic 214 may be further configured to provide for the compression of the mapping stream (or in some embodiments, compression logic may be a separate logic module), as explained further below. The FEC logic 216 is configured to provide for forward error correction. One or more of the above-mentioned software logic (e.g., 212, 214, and/or 216) may be combined with each other as a single module in some embodiments, or distributed among different devices in some embodiments. Note that the above-mentioned software logic (e.g., 212, 214, and/or 216) is also collectively referred to herein as encapsulation logic. The RTP encapsulation logic 212, mapping logic 214, and FEC logic 216 comprise instructions that, when executed by the processor 206, cause the processor 206 to perform the various functions of the RTP encapsulator 104. In some embodiments, functionality of one or more of the RTP encapsulation logic 212, mapping logic 214, and FEC logic 216 may be implemented at least in part via fixed or programmable logic, such as an integrated circuit or field programmable gate array (FPGA), among others.

Figure 3:
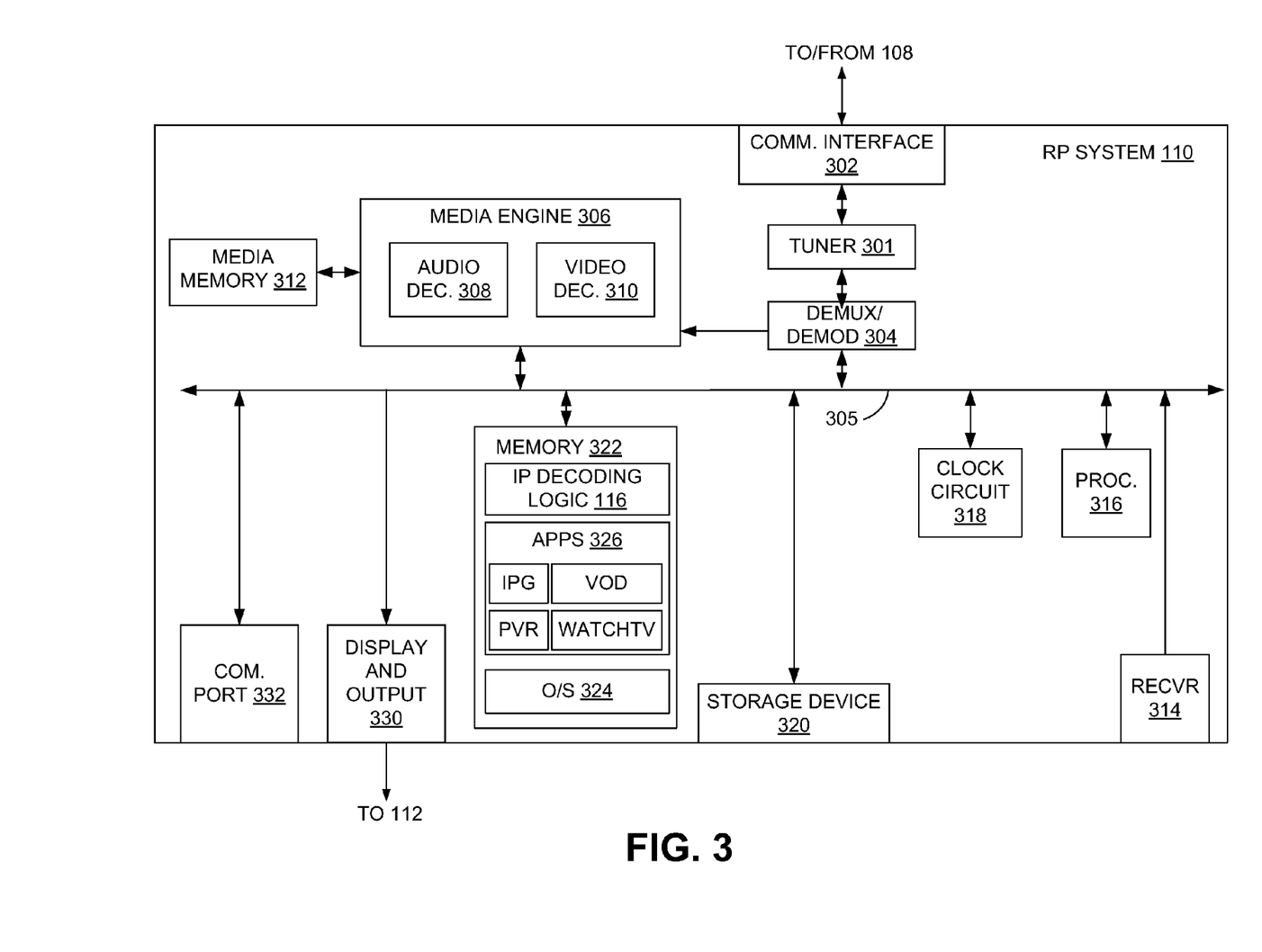
FIG. 3 is a block diagram that illustrates an embodiment of an example receive-and-process (RP) system of an example VQE system.

FIG. 3 is a block diagram that illustrates an embodiment of an example RP system 110. It should be understood by one having ordinary skill in the art, in the context of the present disclosure, that the RP system 110 shown in FIG. 3 is merely illustrative, and should not be construed as implying any limitations upon the scope of the disclosure. The RP system 110 includes a communication interface 302 (e.g., depending on the implementation, suitable for enabling communication functionality for raw IP and non-IP video streams, an IP network, a coaxial cable network, an HFC network, wireless network, etc.) coupled to a tuner system 301 (e.g., radio frequency tuning), which comprises one or more tuners for receiving the raw-IP and non-IP video streams received via the communication interface 302. The tuning system 301 is coupled to a demultiplexer/demodulator 304 (hereinafter, referred to also as a demux 304). The demux 304 is configured to demodulate the received carrier signal and parse raw or non-IP transport stream packets of one or more defined carrier frequencies to identify and extract information in the video stream (e.g., transport stream) to facilitate the identification, extraction, and processing of the compressed pictures. Such information may include Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport stream (including packetized elementary stream (PES) packet information). Such information, which includes identifying information such as PCR, payload_unit_start_indicator, continuity counter, etc., is forwarded to or otherwise received by the IP decoding logic 116 and/or media engine 306 as explained further below. In one embodiment, the demux 304 is configured with programmable hardware (e.g., PES packet filters). In some embodiments, the demux 304 is configured in software, or a combination of hardware and software.

The demux 304 is coupled to a bus 305 and to a media engine 306 (also known as an audio/video (a/v) processing or decoding device). The media engine 306 comprises, in one embodiment, decoding logic comprising one or more of a respective audio decoder 308 and video decoder 310. The decoding logic is further configured by the IP decoding logic 116 for processing IP streams. Though shown as a software module in memory 322, the IP decoding logic 116 may reside in the media engine 306 or elsewhere in the RP system 110, and hence may also be referred to herein as part of the decoding logic in some embodiments. The media engine 306 is further coupled to the bus 305 and to media memory 312, which in one embodiment comprises one or more buffers for temporarily storing compressed and/or reconstructed pictures. In some embodiments, the buffers of the media memory 312 may reside in other memory (e.g., memory 322, explained below).

The RP system 110 further comprises additional components coupled to bus 305. For instance, RP system 110 further comprises a receiver 314 configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), one or more processors (one shown) 316 for controlling operations of the RP system 110, and a clock circuit 318 comprising phase and/or frequency locked-loop circuitry to lock into system clock information (e.g., program clock reference, or PCR, which may be used to reconstruct the system time clock (STC) at the RP system 110) received in the video stream (e.g., adaptation field of the transport stream) to facilitate decoding operations and to clock the output of reconstructed audiovisual content. For instance, PTS/DTS values received in a transport stream are compared to the reconstructed STC (generated by the clock circuit 318) to enable a determination of when the buffered compressed pictures are provided to the video decoder 310 for decoding (DTS) and when the buffered, decoded pictures are output by the video decoder 310 (PTS) to display and output logic 330 for processing and subsequent presentation on a display device 112. In some embodiments, clock circuit 318 may comprise plural (e.g., independent or dependent) circuits for respective video and audio decoding operations. Although described in the context of hardware circuitry, some embodiments of the clock circuit 318 may be configured as software (e.g., virtual clocks) or a combination of hardware and software. Further, in some embodiments, the clock circuit 318 is programmable.

The RP system 110 further comprises, in one embodiment, a storage device 320 (and associated control logic) to temporarily store buffered content and/or to more permanently store recorded content. Memory 322 in the RP system 110 comprises volatile and/or non-volatile memory, and is configured to store executable instructions or code associated with an operating system 324, and one or more applications 326 (e.g., interactive programming guide (IPG), video-on-demand (VoD), personal video recording (PVR), WatchTV (associated with broadcast network TV), among other applications such as pay-per-view, music, driver software, etc.).

Further included in one embodiment of memory 322 is IP decoding logic 116, referred to previously, and which in one embodiment is configured in software. In some embodiments, IP decoding logic 116 may be configured in hardware, or a combination of hardware and software. The IP decoding logic 116, which operates in conjunction with the decoding logic of the media engine 306, is responsible for processing mapping streams (e.g., synchronizing or matching packets of the received raw or non-IP flows with FEC packets and/or the identity of packets of an associated retransmission stream), building RTP packets based on the mapping stream, detecting and/or identifying missing or corrupted transport packets, processing FEC packets to recover missing or corrupted packets, requesting retransmission and processing the retransmission, re-ordering of retransmission packets, and generating and facilitating the delivery of feedback (e.g., RTCP) reports. In other words, the IP decoding logic 116 comprises code or other logic that enables VQE functionality at the RP system 110 despite the absence of RTP-encapsulated MPEG stream receiving/processing functionality in the RP system 110.

The RP system 110 is further configured with the display and output logic 330, as indicated above, which includes graphics and video processing pipelines as known in the art to process the decoded pictures and provide for presentation (e.g., display) on display device 112. A communications port 332 (or ports) is further included in the RP system 110 for receiving information from and transmitting information to other devices. For instance, the communication port 332 may feature USB (Universal Serial Bus), Ethernet, IEEE-1394, serial, and/or parallel ports, etc. In addition, communications port 332 may be configured for home networks (e.g., HPNA/MoCA, etc.), enabling VQE functionality to be employed for networks local to the RP system 110. The RP system 110 may also include an analog video input port for receiving analog video signals.

One having ordinary skill in the art should understand in the context of the present disclosure that the RP system 110 may include other components not shown, including a compression engine, memory, decryptors, samplers, digitizers (e.g., analog-to-digital converters), multiplexers, conditional access processor and/or application software, driver software, Internet browser, among others. Further, though the IP decoding logic 116 is illustrated as residing in memory 322, it should be understood that such logic 116 may be incorporated in the media engine 306 in some embodiments, or elsewhere. Similarly, in some embodiments, functionality for one or more of the components illustrated in, or described in association with, FIG. 3 may be combined with another component into a single integrated component or device.

Having described various components of one or more embodiments of a VQE system, attention is directed to the block diagrams of FIGS. 4-6, which include one or more of the components illustrated in FIGS. 1-3 to illustrate certain embodiments of the VQE systems. Referring to FIG. 4, shown is one VQE system embodiment 400 that includes the non-IP source 102 providing a single program transport stream (SPTS) or multiple program transport stream (MPTS), non-IP video stream (comprising MPEG-2TS packets), such as corresponding to a broadcast television program, to the RTP encapsulator 104, and to the RP system 110 via the communications network 108. The RTP encapsulator 104, and in particular the RTP encapsulation logic 212 (FIG. 2) applies IP/UDP/RTP encapsulation to the received non-IP video stream, and provides the RTP-encapsulated MPEG flows to the R/R server 106 via the IP network 402. The mapping logic 214 (FIG. 2) of the encapsulator 104 generates a mapping stream based on the encapsulation. The mapping stream comprises a mapping of each MPEG-2TS 188-byte cell into the corresponding RTP packet, enabling each cell to be unambiguously referenced in an RTP-based loss recovery process implemented by the IP decoding logic 116 of the RP system 110. The RTP encapsulator 104 provides the mapping stream to the RP system 110 via the IP network 402. The mapping of the SPTS or MPTS video streams or flows may be achieved according to one of a variety of mechanisms, several of which are described below.

The FEC logic 216 (FIG. 2) of the encapsulator 104 may build RTP-encapsulated FEC packets corresponding to the non-IP video stream. The mapping (e.g., in the form of a data structure as described below) and optionally the FEC packets are provided over an IP network 402 to the RP system 110. In some embodiments, the mapping and/or the FEC packets may be communicated to the R/R server 106 (or logic, such as retransmission/repair logic 404 therein, may create the FEC packets in some embodiments), and from the R/R server 106 the mapping and/or FEC packets may be communicated to the RP system 110 via the IP network 402. The R/R server 106 is configured to receive the mapping stream (in some embodiments) and/or the RTP-encapsulated MPEG stream from the RTP encapsulator 104. The R/R server 106 is further configured with retransmission/repair logic 404 and channel change logic 406 that, responsive to a retransmission request or channel change request, respectively, provides a respective retransmission of repair packets (e.g., RTP-encapsulated) or unicast stream corresponding to content of the changed-to channel over the IP network 402 to the RP system 110. The IP network 402 in some embodiments may be part of the communications network 108, and may be considered an out-of-band channel or generally a low-speed link. In some embodiments, the IP network 402 may be separate from the communications network 108.

In one embodiment, when the encapsulation logic 212 builds the RTP packets out of the raw MPEG-2TS packets, the mapping logic 214 (in cooperation with the encapsulation logic 212 or in some embodiments, the functionality of each may be combined in a single module) generates a mapping stream that describes which MPEG-2TS cell (e.g., using transport-level identifying information, such as PID and modulo 7 continuity counter) goes into which RTP packet. In one embodiment, primary correlating elements or identifying information comprises the RTP timestamp, the program clock reference (PCR), the payload_unit_start_indicator, and the PIDs and corresponding continuity counters. For SPTS flows that follow RFC 2250 (i.e., RTP encapsulation of MPEG-2TS flows) and use the 90 kHz portion of the encoder PCR clock as the RTP timestamp, a two-phased approach (general-to-specific) may be implemented in which the general area of the correlation can be identified using the clocks, and then the pattern of the PID and continuity counter may be used to precisely map from the raw flows to the RTP encapsulated flows. The mapping logic 214 concatenates each of these record streams (comprising identifying information corresponding to the non-IP and RTP-encapsulated non-IP stream) together and optionally compresses these record streams together using one or more of a plurality of compression algorithms. The mapping logic 214 then delivers (or causes to be delivered) the mapping stream (e.g., via multicast, though not limited to multicast) to the customer premises 114.

The RP systems 110 receive the non-IP video streams (e.g., MPEG-2TS flow), and based on identifying information (e.g., PID, continuity counter) of each received cell in the received non-IP video stream, synchronizes the in-band non-IP video stream with the out-of-band RTP mappings. For one or more cells lost in the in-band flow, the media engine 306 and IP decoding logic 116 of the RP system 110 can repair the lost cell based on knowledge of the RTP sequence numbers of the corresponding RTP packet derived from the mapping stream using the FEC packets and/or the re-transmission capabilities of the out-of-band link The RP system 110 (e.g., IP decoding logic 116 in cooperation with decoding logic of the media engine 306) is further configured to identify misordered packets and locally re-order them based on the mappings.

A data structure for the mapping stream is provided by the mapping logic 214, as represented by the table below, and is referred to herein as a per-RTP encapsulated packet data structure with the following example syntax:

| | |
|---|---|
| RTP sequence number of the encapsulated packet | 16 bits |
| RTP time stamp of the encapsulated packet | 32 bits |
| Length of the RTP header of encapsulated packet (e.g., byte-length of the length field), or alternatively for RTP header with extension, 4 bits is replaced with 8 bits | 4 bits |
| Optional entire RTP header of encapsulated packet | variable |
| Number of cells in this packet (e.g., seven) | 3 bits |
| PID of the first cell | 13 bits |
| Continuity counter of the first cell | 4 bits |
| ⋮ | ⋮ |
| Pro of the nth cell | 13 bits |
| Continuity counter of the nth cell | 4 bits |

The mapping logic 214 builds the data structure as the encapsulation logic 212 encapsulates the MPEG-2TS (MPTS or SPTS) packets into IP/UDP/RTP packets, and in one embodiment, sends the mapping to the IP decoding logic 116. Note that from the above-table, additional or different identifying information may be used to, for instance, aid in synchronization, such as the addition of the payload_unit_start_indicator. Further note that the dotted lines between the continuity counter of the first cell and the PID of the nth cell are used to symbolize or represent the possibility of multiple PID and continuity counters (or other identifying information) for respective cells. When the IP decoding logic 116 and decoding logic of the media engine 306 receive this identifying information along with the good MPEG-2TS stream, the IP decoding logic 116 can synchronize the MPEG-2TS flow with the corresponding RTP flow built upstream. If the full header is sent (e.g., optional in the above data structure), the IP decoding logic 116 can build the entire RTP flow, enabling RTCP feedback reports and/or processing of the RTP flow internally (e.g., using an RTP layer) or by a downstream device. When the IP decoding logic 116 (in cooperation with the decoding logic of the media engine 306) detects a discontinuity, the RTP sequence number of the start of the outage is also discernible. When data reception resumes (e.g., after the outage is over), the IP decoding logic 116 can determine the RTP sequence number of the data received after the dropped data, and apply either FEC or request retransmission to recover the missing packet(s) (via recovering the missing cell(s) out of the RTP packet(s) from the R/R server 106).

It should be understood by one having ordinary skill in the art, in the context of the present disclosure, that the above data structure is one illustrative example among many of an example mapping stream, and that other data structures may be employed in some embodiments and hence are contemplated to be within the scope of the present disclosure.

The mapping stream can optionally be compressed (e.g., via compression logic integrated with the mapping logic 214 or separate from the mapping logic in some embodiments, as explained above) according to one or mechanisms by noting the structure of the typical data. For instance, the RTP sequence numbers typically increment monotonically. In one example form of compression, the RTP timestamp may be represented as a base time and a time delta. Several observations facilitate this form of compression, including the observation that there exists a very small number of PID values per SPTS, and a well-bounded number of PID values per MPTS. Further, the PID values tend to cluster, with video as the dominant PID. Based on these observations, a stateful compression algorithm may be instantiated at session establishment. The session establishment instantiates (e.g., via two-way handshake or periodic status packets) a base RTP sequence number, base RTP timestamp, and an enumerated list of PIDs. In other words, the baseline compression algorithm uses an offset from the RTP sequence number, an offset from the baseline RTP timestamp, and an enumerated type rather than the actual PID.

Further compression is possible by noting that there are often long runs of sequential video-only cells. These runs may be compressed using a form of Run Length Encoding (RLE). For example, the notation "PID N for M cells with incrementing CC" may be easily encoded. If a packet was not compressible (e.g., a "strange PID"), it may be sent uncompressed.

FIG. 5A is a block diagram that illustrates another VQE system embodiment 500A. It should be appreciated that like-numbered components to those shown in FIG. 4 comprise the same architecture and functionality, and hence discussion of the same is omitted except where helpful to the below-description. The VQE system 500A includes the raw-IP source 101 delivering raw-IP (e.g., IP/UDP/MPEG) SPTS flows to both the IP network 402 and to the RTP encapsulator 104. The RTP encapsulator 104 RTP-encapsulates the raw-IP video flow and builds FEC packets. Further, the RTP encapsulator 104 builds the mapping (e.g., a table, though not limited to a table data structure) of cell-to-RTP packets, as described above. With UDP packets as an input to the RTP encapsulator 104, mapping is simplified (relative to mapping for MPEG-2TS to RTP conversion as described in association with FIG. 4) since one UDP packet is typically encapsulated into a single RTP packet. However, knowledge or information is still used as to which UDP packet corresponds to which RTP packet. In one embodiment, one UDP packet comprises seven (7) TS packets or cells. In some embodiments, the number of TS packets per UDP packet is different than seven (e.g., depending on network settings). Using the seven TS packet-to-UDP packet example, in a single transport stream, the first seven TS packets go to the first RTP packet, and the next seven TS packets go to the second RTP packet, and so on. By following identifying information such as the continuity counter, an inference may be made as to which TS packet went into which RTP packet.

Considering that RTP sequence numbers are sixteen (16) bits and generally have a random starting value, and further considering the fact that continuity counters are much smaller numbers than RTP sequence numbers, there is not a ready match between the continuity counters and the RTP sequence numbers. To facilitate a correlation between TS and RTP packets (e.g., to uniquely identify the correspondence between TS packets and RTP packets built by the RTP encapsulator 104), other (in lieu of or supplemental to PID and continuity counters) identifying information may be used, such as the PCR available in the transport stream, which may be correlated to the RTP timestamp. In one embodiment, the mapping may be in table data structure format, with each TS packet corresponding to RTP packet identifying information (e.g., timestamp). The table may be distributed as part of the mapping stream, optionally in compressed form, and in some embodiments, multicast to plural RP systems 110. In some embodiments, the mapping information for each RTP packet may also be sent after each packet. If sufficient RTP identifying information is sent to the RP systems 110, the IP decoding logic 116 can build RTP packets (or in some embodiments, at least a valid RTP sequence number and time stamp) and provide RTP functionality such as the ability to generate RTCP feedback reports (or variants thereof), and send them back to the R/R server 106 and/or RTP encapsulator 104, as well as implement RTP-based FEC and/or retransmission as described above.

Continuing the description of FIG. 5A, the RP system 110 tunes to the raw-IP video stream, and the accessed data is routed to the IP decoding logic 116 and decoding logic of the media engine 306 of the RP system 110. The IP decoding logic 116 keeps track of the SPTS or MPTS flows (based on identifying information) as the decoding logic of the media engine 306 decodes the stream. When the IP decoding logic 116 in cooperation with the decoding logic of the media engine 306 detects a discontinuity, packet-level repair or retransmission, or a combination of both, may be deployed in similar manner as described above in association with FIG. 4.

Referring to FIG. 5B, shown is another VQE system embodiment, designated as VQE system 500B, which is illustrative of a brownfield environment that includes legacy RP systems (i.e., does not possess IP decoding logic 116), such as RP system 502, and RTP-encapsulated MPEG stream capable systems, such as RP system 510 that also includes IP decoding logic 116. The legacy RP system 502 continues to use raw-IP video flows. The RTP-encapsulated MPEG stream capable RP system 510 is configured to receive and process RTP-encapsulated video streams (RTP flow), and also includes IP decoding logic 116 to enable VQE functionality. If insufficient bandwidth exists in the core/access/last mile portion of the communications network 108 (including the IP network 402) to carry both the raw-IP flow and the RTP flow, the RP system 510 may be configured to tune to the raw-IP flow and apply the mapping to enable VQE functionality in similar manner as described above for FIG. 5A.

FIG. 6 is a block diagram that illustrates another VQE system embodiment 600 that provides RTP encapsulation functionality (e.g., RTP encapsulator 104A) at a gateway 606, with features from VQE systems 400 and 500 as described above incorporated therein. It should be appreciated that VQE system 600 may omit one of the sources in some embodiments. The gateway 606 resides in one of the customer premises 114, and includes RTP encapsulator 104A to provide RTP-encapsulation of raw and/or non-IP video streams received from upstream devices, as well as retransmission/repair logic 604. The RTP-capable RP system 602 receives and processed RTP-encapsulated MPEG streams from the gateway 606, whereas the gateway 606 passes (or reconfigures) a mapping stream for delivery (with optionally FEC packets) to the IP decoding logic 116 of the RP system 110. In some embodiments, the mapping stream may be generated at the gateway 606, hence obviating any need to receive the mapping stream over the network 402. Note that such conversion functionality may be employed anywhere in the network where there is access to a raw-IP (or non-IP) video stream. FEC flows and/or retransmissions can be generated at the gateway 606 and passed to subtending devices (e.g., RP system 110), with RTP/RTCP transactions (e.g., feedback reports) occurring between the gateway 606 and the RP system 110 (and between the gateway 606 and R/R server 106 over the IP network 402).

Note that for one or more embodiments described above, if the individual SPTS flows within a QAM's MPTS are mapped as if they were SPTS flows, this methodology can work for an MPTS raw MPEG-2TS flow to be converted to RTP in the home using similar techniques. The RTP encapsulator 104 and the R/R server 106 should handle the individual SPTS flows within the MPTS with respect to FEC and sequence numberings.

Note that variations of the embodiments described above are also contemplated to be within the scope of the disclosure. For instance, one VQE system embodiment generates one RTP packet per MPEG-TS packet. In other words, the mapping is achieved according to a 1:1 correspondence between each TS packet and each RTP packet, and the RTP sequence numbers are generated at the RP system 110 with comparatively limited explicit mapping knowledge. Though overhead may be increased, it is not considered significant since the RTP packets are used exclusively for FEC processing (i.e., not for primary distribution and hence not used all of the time). FEC may be applied over the RTP packets, each containing exactly one MPEG-TS. All VQE benefits of retransmission, FEC, and RTCP reporting are capable of being retained.

As another example variation, one VQE system embodiment comprises an RTP encapsulator 104 that employs the mapping in the manner described above, but does not deliver a mapping stream to the RP system 110. Rather, the RTP encapsulator 104 stores the mappings locally (or in some embodiments, communicates the mappings to the R/R server 106). Further, the R/R server 106 is configured to receive non-RTCP retransmission requests from the RP system 110. When the RP system 110 identifies missing packets, it prompts the sending of an auxiliary stream (e.g., auxiliary data, such as a non-RTCP request delivered in, for instance, an out-of-band channel) to the R/R server 106. The auxiliary stream includes TS packet-level identifying information (e.g., PID, continuity counter, PCR, etc.) for a defined number of packets received before the missing or corrupted packets of the non-IP or raw-IP video stream. The R/R server 106 synchronizes with the locally-stored mapping stream generated by the RTP encapsulator 104 and identifies the requested packets for delivery back to the RTP system 110. For instance, the R/R server 106 responsively, maps the "fingerprint" of the "good" received cells onto the data flows, synchronizing the good period before the outage with the original flow. The R/R server 106 identifies the dropped cells, and sends those to the decoding logic of the RP system 110. In other words, the R/R server 106, using the locally-stored mappings, maps the identifying information into the recent data, establishing synchronization with the good stream. The R/R server 106 sends the missing data to the RP system 110 with identifying information (e.g., pointers) to enable reconstitution and synchronization by the IP decoding logic 110 with the received raw or non-IP video stream possessing the transmission error. Other methods that do not use a pointer may be used in some embodiments.

In view of the description above, it should be appreciated that fast channel change implementations can be understood as a form of retransmission-based loss repair, where the RP system 110 sends a request for a new channel to the R/R server 106 without an identification of missing packets. An RP system 110 equipped with IP decoding logic 116 enables this feature.

As set forth above, certain embodiments of the VQE systems enable loss repair, rapid channel change, as well as quality monitoring in one-way deployments, among others, where the RP systems 110 receive a primary source stream in a non-IP, MPEG-based format or other transport formats.

The RTP encapsulator 104 and IP decoding logic 116 may be implemented in hardware, software, firmware, or a combination thereof. To the extent certain embodiments of the RTP encapsulator 104 and IP decoding logic 116 or a portion thereof are implemented in software or firmware, executable instructions for performing one or more tasks of the RTP encapsulator 104 and IP decoding logic 116 are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the RTP encapsulator 104 and IP decoding logic 116 or a portion thereof are implemented in hardware, the RTP encapsulator 104 and IP decoding logic 116 may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 7:
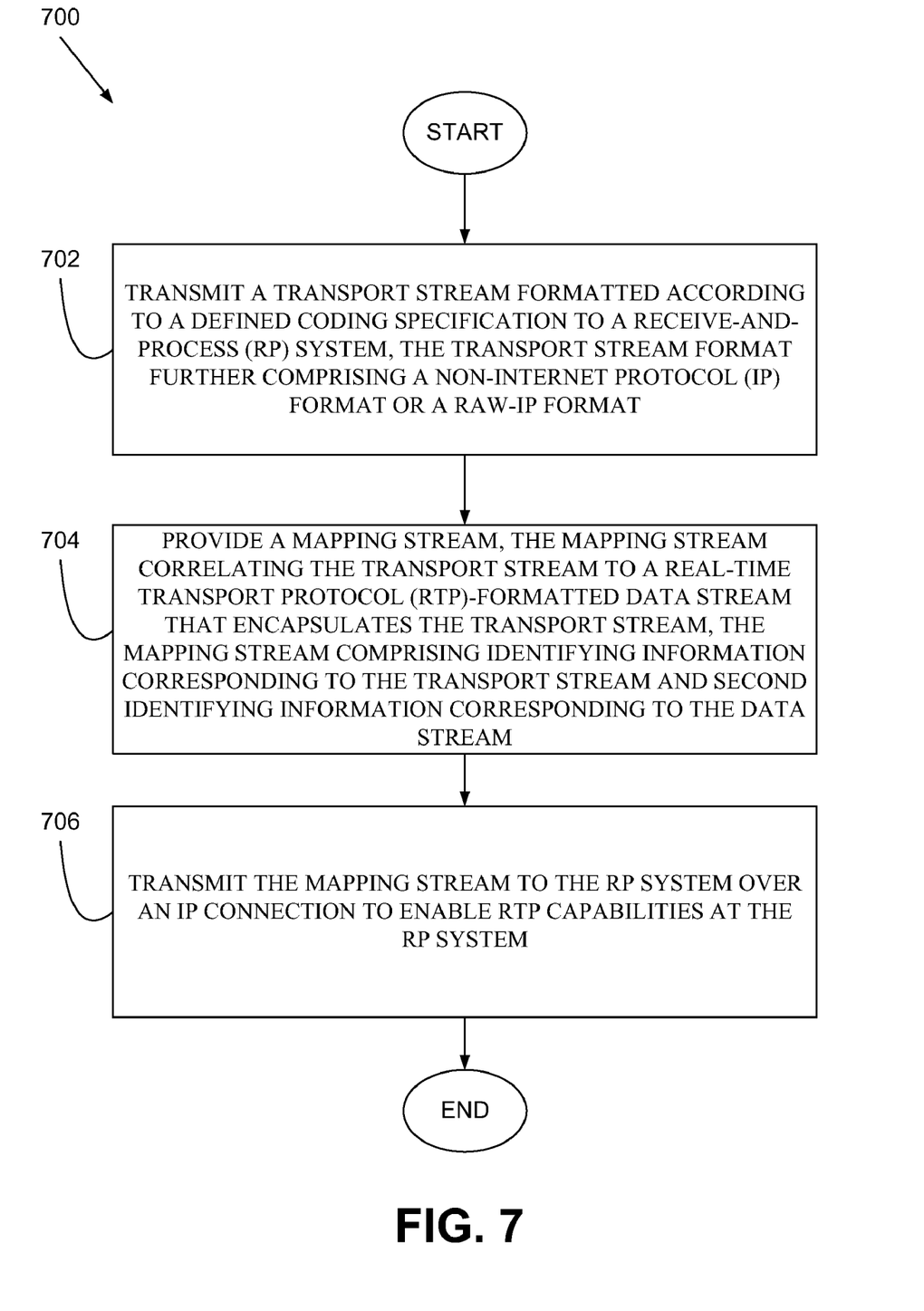
FIG. 7 is a flow diagram that illustrates one VQE method embodiment.

Having described various embodiments of VQE system, it should be appreciated that one method embodiment 700, implemented in one embodiment by logic (hardware, software, or a combination thereof) of the VQE system and shown in FIG. 7, comprises transmitting a transport stream formatted according to a defined coding specification to a receive-and-process (RP) system, the transport stream format further comprising a non-Internet protocol (IP) format or a raw-IP format (702); providing a mapping stream, the mapping stream correlating the transport stream to a Real-time Transport Protocol (RTP)-formatted data stream that encapsulates the transport stream, the mapping stream comprising identifying information corresponding to the transport stream and second identifying information corresponding to the data stream (704); and transmitting the mapping stream to the RP system over an IP connection to enable RTP capabilities at the RP system (706).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIG. 7 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIG. 7, either in the beginning, end, and/or as intervening steps.

It should be emphasized that the above-described embodiments of the present disclosure are merely possible examples of implementations, merely set forth for a clear understanding of the principles of the VQE systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method, comprising:
   transmitting over an in-band communication a transport stream formatted according to a defined coding specification to a receive-and-process (RP) system, the transport stream format further comprising a non-Internet protocol (IP) format or a raw-IP format;
   providing a mapping stream, the mapping stream comprising identifying information corresponding to the transport stream and second identifying information corresponding to the data stream; and
   transmitting the mapping stream to the RP system over an IP connection to enable Real-time Transport Protocol (RTP) capabilities at the RP system, further configuring the RP system to request a channel change based on a retransmission loss repair mechanism over the IP connection, wherein the RP system is configured to provide RTP functionality based on the mapping stream.

2. The method of claim 1, wherein the coding specification is Moving Picture Experts Group (MPEG)-2 compliant.

3. The method of claim 1, further comprising transmitting RTP-encapsulated forward error correction (FEC) packets to the RP system.

4. The method of claim 1, wherein the identifying information comprises an indicator corresponding to one or more of a start of a first byte of an elementary video or audio stream, a system clock reference, a packet identifier, or a continuity counter.

5. The method of claim 1, wherein providing the mapping stream comprises uniquely correlating the identifying information with the second identifying information in the data stream.

6. The method of claim 5, wherein the second identifying information includes a time stamp or a numerical value based on the time stamp.

7. The method of claim 1, wherein providing further comprises compressing the mapping stream, the compression based on one or more of enumerating base identifying information of a first packet of the data stream mapped to a first portion of the raw-IP or non-IP transport stream and referencing identifying information of an additional packet of the data stream as an offset to the base enumeration corresponding to a second portion of the raw-IP or non-IP transport stream, or run-length-encoding of the mapping stream.

8. The method of claim 1, further comprising receiving a retransmission request from the RP system over the IP connection based on packet-level detection of an error in transmission of the video stream.

9. The method of claim 1, further comprising receiving an RTP Control Protocol (RTCP) feedback report from the RP system over the IP connection.

10. The method of claim 1, wherein the raw-IP transport stream comprises IP/User Datagram Protocol (UDP) encapsulation and the non-IP transport stream is devoid of IP/UDP encapsulation.

11. The method of claim 1, further comprising encapsulating the non-IP or raw-IP transport stream to derive the RTP-formatted data stream.

12. The method of claim 1, wherein the non-IP or raw-IP transport stream is embodied as a single program transport stream or a transport stream comprising multiple programs.

13. The method of claim 1, wherein the mapping stream comprises a data structure having a sequence number of the RTP encapsulated packet and the PID and continuity counter of the correlated portion of the non-IP or raw-IP transport stream.

14. A system, comprising:
   a Real-time Transport Protocol (RTP) encapsulator comprising one or more processors comprising encapsulation logic, the encapsulation logic capable of RTP encapsulating non-Internet Protocol (IP) flows and raw-IP flows, the RTP encapsulator further configured to generate a mapping stream that correlates respective identifying information of packets in the non-IP flows or raw-IP flows with RTP packets of the RTP encapsulated non-IP or raw-IP flows, the non-IP flows comprising non-encapsulated Moving Picture Experts Group (MPEG)-2 transport stream (TS) flows, the raw-IP flows comprising IP/User Datagram Protocol (UDP)/MPEG2TS flows, the mapping stream delivered over an IP connection to a receive-and-process (RP) system, the RTP encapsulator further configured to optionally provide RTP-encapsulated forward error correction (FEC) packets to the RP system; and
   a server communicatively coupled to the RTP encapsulator, the server comprising: retransmission/repair logic configured to facilitate correction of video or audio transmission errors by retransmitting corrected packets encapsulated in RTP for corresponding lost or corrupted packets, wherein the server is further configured to locally store the mapping stream, and responsive to a reception of an auxiliary stream comprising transport-level identifying information corresponding to lost or corrupted packets received at the RP system and transport-level identifying information corresponding to packets preceding the lost or corrupted packets, synchronizing the lost or corrupted packets with RTP packets based on the mapping stream, and causing the transmission of packets comprising a retransmission of good packets corresponding to the lost or corrupted packets.

15. The system of claim 14, wherein the mapping is from transport stream cells to RTP packets on a 1:1 basis.

16. A system, comprising:
   a receive-and-process (RP) system comprising one or more processors capable of receiving a non-Internet Protocol (IP) media content stream and a raw-IP media content stream each carried as a transport stream over an in-band communication and configured to receive a mapping stream over an IP connection, the RP system further configured to synchronize the non-IP or raw-IP media content stream with a Real-time Transport Protocol (RTP) data stream based on first and second identifying information of the media content stream and the data stream, respectively, the mapping stream comprising the first and second identifying information, the RP system incapable of receiving RTP-encapsulated transport stream flows and configured to provide RTP functionality based on the mapping stream, wherein the RP system is further configured to request a channel change based on a retransmission loss repair mechanism over the IP connection.

17. The system of claim 16, wherein the RP system is further configured to perform one or more of the following RTP functionality: responsive to detection of a video or audio transmission error, generate an RTCP feedback report for transmittal upstream of the RP system, the feedback report identifying a portion of the video or audio stream corresponding to the video transmission error; request an RTP-encapsulated retransmission over the IP connection based on detection of the video or audio transmission error; or forward error correct the portion based on reception of RTP-encapsulated forward error correction (FEC) packets over the IP connection.

* * * * *